United States Patent
Ge et al.

(10) Patent No.: US 11,069,308 B2
(45) Date of Patent: Jul. 20, 2021

(54) PIXEL UNIT, DISPLAY METHOD THEREOF AND DISPLAY PANEL

(71) Applicants: CHONGQING BOE OPTOELECTRONICS TECHNOLOGY CO., LTD., Chongqing (CN); BOE TECHNOLOGY GROUP CO., LTD., Beijing (CN)

(72) Inventors: Shikang Ge, Beijing (CN); Yucheng Li, Beijing (CN); Wei Dai, Beijing (CN); Zhuqing Zhang, Beijing (CN); Hening Zhang, Beijing (CN); Xinyu Wang, Beijing (CN); Xufeng Tu, Beijing (CN); Wei Chen, Beijing (CN); Xu Li, Beijing (CN); Fei Pan, Beijing (CN); Xiangchao Chen, Beijing (CN); Zhongsen He, Beijing (CN); Ping Zhang, Beijing (CN); Jinhong Zhang, Beijing (CN)

(73) Assignees: CHONGQING BOE OPTOELECTRONICS TECHNOLOGY CO., LTD., Chongqing (CN); BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 16/553,441

(22) Filed: Aug. 28, 2019

(65) Prior Publication Data
US 2020/0251060 A1    Aug. 6, 2020

(30) Foreign Application Priority Data

Jan. 31, 2019 (CN) .......................... 201910099898.5

(51) Int. Cl.
*G09G 3/34* (2006.01)
*G02F 1/1335* (2006.01)
(Continued)

(52) U.S. Cl.
CPC ..... *G09G 3/3486* (2013.01); *G02F 1/133514* (2013.01); *G02F 1/133753* (2013.01); *G09G 3/3607* (2013.01); *G02F 1/134345* (2021.01)

(58) Field of Classification Search
CPC ...................................................... G09G 3/348
See application file for complete search history.

(56) References Cited

U.S. PATENT DOCUMENTS

| 5,912,652 A | 6/1999 | Seo |
| 9,323,044 B2 | 4/2016 | Feenstra et al. |

(Continued)

FOREIGN PATENT DOCUMENTS

| CN | 1105127 A | 7/1995 |
| CN | 104781719 A | 7/2015 |

(Continued)

OTHER PUBLICATIONS

The First Chinese Office Action dated Mar. 24, 2021; Appln. No. 201910099898.5.
Search Results Appln. No. 201910099898.5.

*Primary Examiner* — Edmond C Lau (57) ABSTRACT

A pixel unit, a display method thereof and a display panel are provided. The pixel unit includes a display region and a non-display region, further includes a first substrate, a second substrate, a fluid layer and a control structure, the fluid layer is disposed between the first substrate and the second substrate, a fluid is disposed in the fluid layer, a flow of the fluid is controllable, and the control structure is disposed between the first substrate and the second substrate and configured to control the flow of the fluid.

19 Claims, 7 Drawing Sheets

(51) Int. Cl.
   *G02F 1/1337* (2006.01)
   *G09G 3/36* (2006.01)
   *G02F 1/1343* (2006.01)

(56) References Cited

U.S. PATENT DOCUMENTS

2013/0235445 A1* 9/2013 Teranishi ............. G02B 26/005
                                                    359/290
2015/0370141 A1* 12/2015 Guo ................... G02F 1/16757
                                                    359/296

FOREIGN PATENT DOCUMENTS

| CN | 106371260 A | 2/2017 |
| KR | 20150060326 A | 6/2015 |

\* cited by examiner

PIXEL UNIT, DISPLAY METHOD THEREOF AND DISPLAY PANEL

TECHNICAL FIELD

At least one embodiment of the present disclosure relates to a pixel unit, a display method thereof and a display panel.

BACKGROUND

In recent years, with the advancement of display technology, people have higher and higher requirement on various performances of display devices, such as high brightness, low power consumption, high color gamut, high contrast, and high dynamic contrast. However, the current display panel has low light transmittance, so the utilization of light (for example, backlight) is low, and then the brightness of a display image is low, which limits the visual effect of the display image.

SUMMARY

At least one embodiment of the present disclosure provides a pixel unit, the pixel unit comprises a display region and a non-display region, further comprises a first substrate, a second substrate, a fluid layer and a control structure, the fluid layer is disposed between the first substrate and the second substrate, a fluid is disposed in the fluid layer, a flow of the fluid is controllable and the control structure is disposed between the first substrate and the second substrate and configured to control the flow of the fluid.

For example, a grayscale of the pixel unit is increased with a reduction of an amount of the fluid in the display region.

For example, the grayscale of the pixel unit is increased with a reduction of a thickness of the fluid in the display region.

For example, the fluid is an electromagnetic fluid, the fluid layer is an electromagnetic fluid layer, and the fluid is a non-transparent magnetic liquid and includes a magnetic particle, a base fluid and an active agent.

For example, in a non-display state, at least a portion of the electromagnetic fluid of the electromagnetic fluid layer is located in the display region.

For example, the control structure includes a magnetic layer and a control electrode, the magnetic layer is disposed on the second substrate and at least partially disposed in the display region, the control electrode is disposed between the first substrate and the second substrate, the magnetic layer is configured to be a transparent film layer, and the control electrode is configured to generate an electric field when the pixel unit is in a display state, so that the electromagnetic fluid of the electromagnetic fluid layer flows from the display region to the non-display region.

For example, in a non-display state, the electromagnetic fluid of the electromagnetic fluid layer is located in the display region, the magnetic layer is disposed in the display region, and the control electrode is disposed in the non-display region.

For example, the control electrode includes a first electrode disposed on the first substrate and a second substrate disposed on the second substrate, and orthographic projections of the first electrode and the second electrode on the first substrate are at least partially overlapped.

For example, the magnetic layer and the second electrode are arranged in an identical layer.

For example, the magnetic layer and the second electrode are an integral structure.

For example, the magnetic layer includes a magnetic metallic element.

For example, in a non-display state, the electromagnetic fluid of the electromagnetic fluid layer is located in the display region and the non-display region, and the control electrode is disposed in the non-display region.

For example, the control electrode includes a first electrode disposed on the first substrate and a second electrode disposed on the second substrate, orthographic projections of the first electrode and the second electrode on the first substrate are at least partially overlapped, the magnetic layer is disposed in the display region and arranged in an identical layer with the second electrode, and the magnetic layer and the second electrode include a magnetic metallic element; or the magnetic layer is disposed in the display region and the non-display region and arranged in different layers with the second electrode, and the magnetic layer and the second electrode are overlapped in the non-display region.

For example, the pixel unit further comprises a pixel define layer, the pixel define layer defines a chamber with the first substrate and the second substrate, the chamber accommodates the fluid layer, and the fluid of the fluid layer is filled into a portion of the chamber.

For example, a volume of the chamber in the non-display region is greater than or equal to a volume of the fluid, and gas is filled into the chamber.

For example, the control electrode includes a first electrode and a second electrode disposed on one of the first substrate and the second substrate, and the first electrode and the second electrode are arranged in an identical layer and are spaced from each other.

At least one embodiment of the present disclosure provides a display panel which comprises the pixel unit as mentioned above.

For example, the display panel further comprises a color filter, the color filter is at least partially disposed in the display region, the color filter is disposed on the first substrate or disposed on the second substrate, and at least one of the first substrate or the second substrate is an array substrate.

At least one embodiment of the present disclosure provides a display method of a pixel unit, the pixel unit includes a display region and a non-display region and further includes a first substrate, a second substrate and a fluid layer which is disposed between the first substrate and the second substrate, a fluid is disposed in the fluid layer and a flow of the fluid is controllable, and the method comprises: controlling the flow of the fluid to adjust a grayscale of the pixel unit; and allowing an amount of the fluid in the display region when the pixel unit is in a non-display state to be greater than an amount of the fluid in the display region when the pixel unit is in a display state.

For example, the pixel unit further includes a control structure, the control structure is configured to control the flow of the fluid and includes a magnetic layer which is at least partially disposed in the display region and a control electrode which is disposed in the non-display region, the fluid is an electromagnetic fluid, and the method further comprises: allowing the electromagnetic fluid to be located on the magnetic layer in the non-display state; and controlling the control electrode to generate an electric field in the display state, so that the electromagnetic fluid flows from the display region to the non-display region.

BRIEF DESCRIPTION OF THE DRAWINGS

In order to clearly illustrate the technical solution of the embodiments of the invention, the drawings of the embodiments will be briefly described in the following; it is obvious that the described drawings are only related to some embodiments of the invention and thus are not limitative of the invention.

REFERENCE NUMERALS OF THE ACCOMPANYING DRAWINGS

100—pixel unit; 110—first substrate; 120—second substrate; 111, 121—drive circuit; 200—electromagnetic fluid layer; 300—magnetic layer; 400—control electrode; 410—first electrode; 420—second electrode; 501—chamber; 510—pixel definition layer; 520—first insulating layer; 530—second insulating layer; 600a, 600b, 600c—color filter.

DETAILED DESCRIPTION

In order to make objects, technical details and advantages of the embodiments of the invention apparent, the technical solutions of the embodiment will be described in a clearly and fully understandable way in connection with the drawings related to the embodiments of the invention. It is obvious that the described embodiments are just a part but not all of the embodiments of the invention. Based on the described embodiments herein, those skilled in the art can obtain other embodiment(s), without any inventive work, which should be within the scope of the invention.

Unless otherwise defined, all the technical and scientific terms used herein have the same meanings as commonly understood by one of ordinary skill in the art to which the present disclosure belongs. The terms, such as "first," "second," or the like, which are used in the description and the claims of the present disclosure, are not intended to indicate any sequence, amount or importance, but for distinguishing various components. The terms, such as "comprise/comprising," "include/including," or the like are intended to specify that the elements or the objects stated before these terms encompass the elements or the objects and equivalents thereof listed after these terms, but not preclude other elements or objects. The terms, such as "connect/connecting/connected," "couple/coupling/coupled" or the like, are not limited to a physical connection or mechanical connection, but may include an electrical connection/coupling, directly or indirectly. The terms, "on," "under," "left," "right," or the like are only used to indicate relative position relationship, and when the position of the object which is described is changed, the relative position relationship may be changed accordingly.

For example, in a liquid crystal display (LCD) panel, an upper polarizer and a lower polarizer are respectively disposed on a light-emitting side and a backlight side of a liquid crystal layer to realize display; the lower polarizer will convert backlight into linearly polarized light, and more than half (for example, 55% or more) of the light will be lost in the process; light passing through the lower polarizer passes through the liquid crystal layer and is irradiated to the upper polarizer; and the upper polarizer will also absorb a certain amount of light (for example, 10% or more). Therefore, the light transmittance of the LCD panel is low, and the utilization of the backlight is low. In addition, due to the characteristics of liquid crystals, even if the liquid crystals are deflected, in a non-display state (for example, the grayscale is zero), partial light will still pass through the upper polarizer, resulting in lower contrast of the display image.

At least one embodiment of the present disclosure provides a pixel unit, a display method thereof and a display panel. The pixel unit comprises a display region and a non-display region and further comprises a first substrate, a second substrate, a fluid layer and a control structure. The first substrate and the second substrate are cell-assembled with each other. The fluid layer is disposed between the first substrate and the second substrate, wherein, the control structure is disposed between the first substrate and the second substrate and configured to control the flow of the fluid; a fluid in the fluid layer is controllable fluid so as to be configured to adjust the grayscale of the pixel unit; and the amount of the fluid in the display region when the pixel unit is in the non-display state is greater than the amount of the fluid in the display region when the pixel unit is in the display state. In the non-display state, at least a portion of the fluid is located in the display region; and when the pixel unit is switched from the non-display state to the display state, the amount of the fluid in the non-display region is increased, and the amount of the fluid in the display region is reduced, even the state of no fluid in the display region can be reached. In the pixel unit, the amount of the fluid in the display region is controlled by utilization of the movement of the fluid between the display region and the non-display region. If the amount of the fluid in the display region is large, the light transmittance of the display region is low; and if the amount of the fluid in the display region is small, the light transmittance of the display region is high. Thus, the light transmittance of the display region of the pixel unit can be adjusted, and then the display grayscale of the pixel unit can be adjusted. In addition, in the pixel unit, no polarizer is required in the aspect of adjusting the light transmittance of the display region, so the utilization of light (e.g., backlight) is high, and then the contrast of the display image can be improved.

For instance, in the pixel unit provided by at least one embodiment of the present disclosure, the grayscale of the pixel unit is increased along with the reduction of the amount of the fluid in the display region, and correspondingly, the grayscale of the pixel unit is reduced along with the increase of the amount of the fluid in the display region. When the amount of the fluid in the display region is higher and higher, due to the shield of the fluid on light, the light transmittance of the display region will be lower and lower, namely the grayscale of the pixel unit is smaller and smaller. Thus, the light transmittance of the display region of the pixel unit can be adjusted, namely the grayscale of the pixel unit can be adjusted.

For instance, in the pixel unit provided by at least one embodiment of the present disclosure, the fluid may be electromagnetic fluid, and the fluid layer is an electromagnetic fluid layer. As the electromagnetic fluid is affected by electric field and magnetic field, the movement of the electromagnetic fluid can be controlled by utilization of the electric field and the magnetic field, and then the amount of the electromagnetic fluid in the display region and the non-display region can be adjusted, and finally the display grayscale of the pixel unit can be adjusted. For instance, in at least one embodiment of the present disclosure, the fluid is fluid which can be controlled to move; the fluid is controllable fluid; by application of electric field or magnetic field, the fluid can flow towards a region where the electric field exists or flow towards a region where a magnetic field exists; when the electric field intensity is greater than the magnetic field intensity, the fluid flows towards the region where the electric field intensity is relatively high; and the type of the fluid may be selected as required, not limited to the electromagnetic fluid.

For instance, in the pixel unit provided by at least one embodiment of the present disclosure, in the non-display state, at least a portion of the electromagnetic fluid of the electromagnetic fluid layer is located in the display region. Thus, in normal state, the grayscale of the pixel unit is 0, that is, the pixel unit and the display panel comprising the pixel unit are in normally black state.

Description will be given below to the pixel unit, the display method thereof and the display panel, provided by at least one embodiment of the present disclosure, with reference to the accompanying drawings, in which the fluid of the fluid layer is electromagnetic fluid.

At least one embodiment of the present disclosure provides a pixel unit. Illustratively, as shown in FIGS. 1A and 1B, the pixel unit 100 comprises a display region 101 and a non-display region 102 and further comprises a first substrate 110, a second substrate 120, a fluid layer 200 and a control structure; the first substrate 110 and the second substrate 120 are cell-assembled with each other; the fluid layer 200 is disposed between the first substrate 110 and the second substrate 120; and the control structure is disposed between the first substrate and the second substrate and configured to control the flow of the fluid.

Figure 1A:
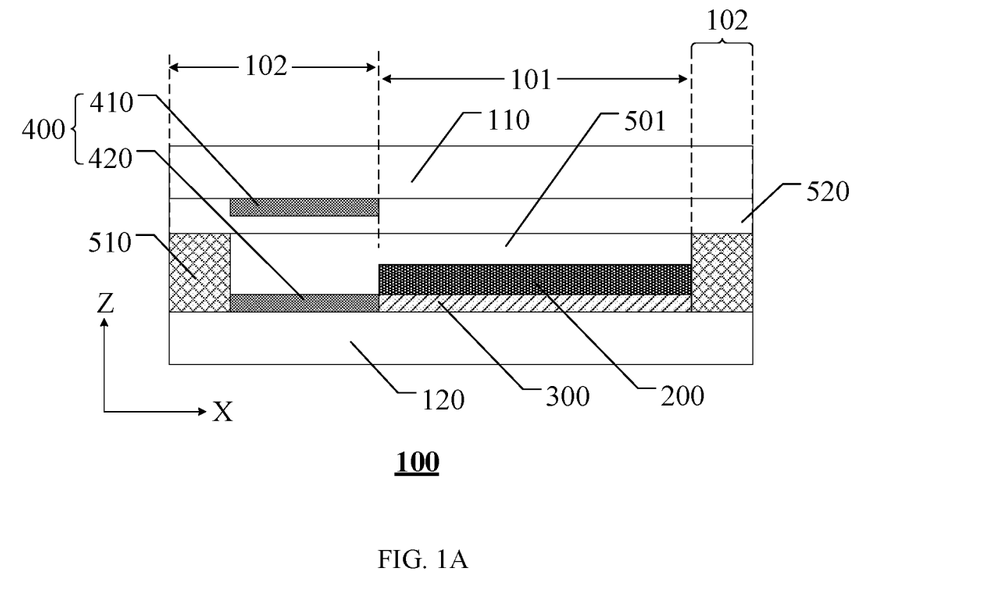
FIG. 1A is a cross-sectional view of a pixel unit provided by some embodiments of the present disclosure in a non-display state.

As shown in FIG. 1A, in the non-display state, the electromagnetic fluid of the electromagnetic fluid layer 200 is located in the display region 101; in this case, the amount of the electromagnetic fluid in the display region 101 is large; light (for example, light from a backlight module, namely backlight) irradiated to the display region 101 will be shielded by the electromagnetic fluid; the display region 101 of the pixel unit 100 has low light transmittance or is opaque; and the pixel unit 100 displays black state, namely the display grayscale is 0. Thus, the pixel unit and the display panel comprising the pixel unit are in normally black state.

Figure 1B:
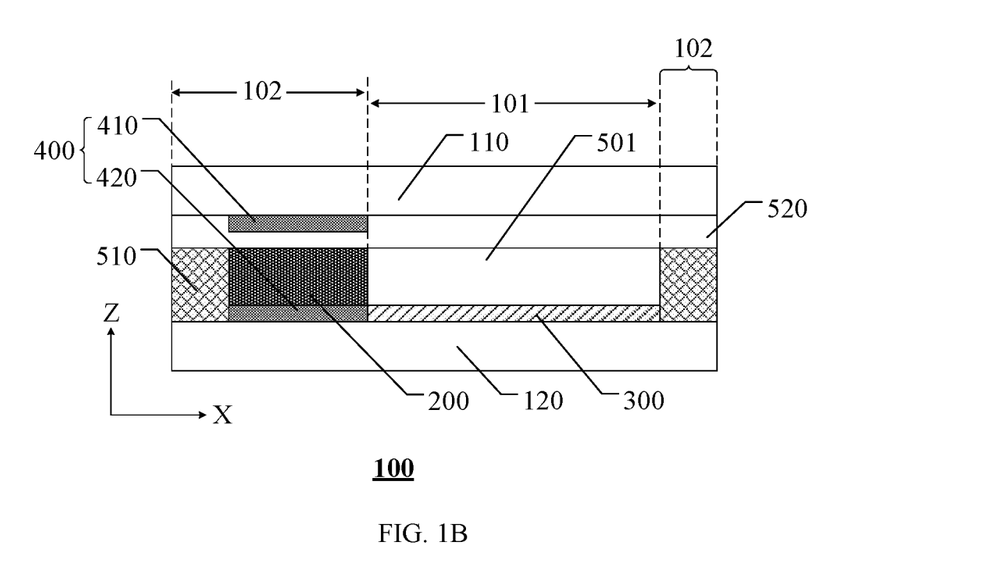
FIG. 1B is a cross-sectional view of the pixel unit as shown in FIG. 1A in a display state.

As shown in FIG. 1B, the pixel unit 100 is switched from the non-display state to the display state; the electromagnetic fluid in the electromagnetic fluid layer 200 moves from the display region 101 to the non-display region 102; the amount of the electromagnetic fluid of the electromagnetic fluid layer 200 in the non-display region 102 is increased; and the amount of the electromagnetic fluid of the electromagnetic fluid layer 200 in the display region 101 is reduced. For instance, as shown in FIG. 1B, when the electric field intensity is relatively high, all the electromagnetic fluid can be moved to the non-display region 102, and there is no electromagnetic fluid in the display region 101. In this case, the light (for example, the light from the backlight module, namely the backlight) irradiated to the display region 101 will not be shielded by the electromagnetic fluid, so the light transmittance of the display region 101 of the pixel unit 100 is high; the pixel unit 100 displays bright state; and the display grayscale is maximum (for example, the pixel unit has 256 grayscales, and the display grayscale is 255). Thus, the light transmittance of the display region 101 can be adjusted by adjustment of the amount of the electromagnetic fluid in the display region 101, and then the display grayscale (for example, 0-255) of the pixel unit 100 can be adjusted. In addition, the pixel unit 100 does not need the polarizer to realize the display grayscale and has high light utilization.

For instance, the adjustment of the amount of the electromagnetic fluid in the display region 101 may be the adjustment of the thickness of the electromagnetic fluid in a direction perpendicular to the first substrate and the second substrate. In the non-display state, the electromagnetic fluid is aggregated on the magnetic layer, and at this point, the display region is opaque and the grayscale is minimum. In the display state, along with the gradual increase of the electric field intensity, when the electric field intensity is increased to a certain degree, the acting force of the electric field on the fluid is greater than the acting force of the magnetic field on the fluid, and the fluid flows towards the region where the electric field intensity is relatively large or the region where the electric field exists under the action of the electric field. Along with the gradual increase of the electric field intensity, the thickness of the fluid in the display region is gradually reduced, and the grayscale is gradually increased. When white is required to be displayed, the grayscale is maximum, namely the thickness of the fluid in the display region is zero and all the fluid flows to the non-display region.

For instance, the electromagnetic fluid may be a non-transparent magnetic liquid and may be stable and dispersed magnetic colloid comprising a magnetic particle, a base fluid and an active agent. The magnetic particle may include nanometer (for example, 10 nanometers) $Fe_3O_4$ particle; the base fluid may include an organic solvent such as methyl carbonate; and the active agent may include an oleinic acid and the like and may be used for preventing the agglomeration of the magnetic colloid. Due to the magnetic particles, the electromagnetic fluid has magnetism. As the magnetic particles are uniformly dispersed in the base fluid, the electromagnetic fluid simultaneously has the flow characteristic of the liquid, can flow under the action of the magnetic field or the electric field, and will not settle and agglomerate under the action of centrifugal force, magnetic field force and electric field force.

For instance, the control structure of the pixel unit provided by at least one embodiment of the present disclosure further includes a magnetic layer and a control electrode; the magnetic layer is configured to be a transparent film layer and disposed on the second substrate and is at least partially disposed in the display region or all disposed in the display region; and the control electrode is disposed between the first substrate and the second substrate and configured to generate an electric field when the pixel unit is in the display state, so that the electromagnetic fluid of the electromagnetic fluid layer can flow from the display region to the non-display region. Along with the increase of the electric field intensity of the electric field, the amount of the electromagnetic fluid entering the non-display region from the display region is increased.

For instance, the control electrode is disposed in the non-display region or the electric field generated by the control electrode mainly acts on the non-display region, and at least a portion of the magnetic layer is located in the display region or the magnetic field of the magnetic layer is at least partially distributed in the display region.

Illustratively, as shown in FIGS. 1A and 1B, the control structure in the pixel unit 100 includes a magnetic layer 300 and a control electrode 400; the magnetic layer 300 may generate a magnetic field in the display region 101; and the control electrode 400 may generate an electric field when applied with voltage in the non-display region 102. As shown in FIG. 1A, in the non-display state, the control electrode 400 does not generate the electric field (for instance, the control electrode 400 is not applied with voltage), and the magnetic particles of the electromagnetic fluid are aggregated towards the magnetic layer 300 under the action of the magnetic field, so as to drive the electromagnetic fluid to move to cover the magnetic layer 300. As shown in FIG. 1B, in the display state, the control electrode 400 generates the electric field, for instance, when the acting force of the electric field on the electromagnetic fluid is greater than the acting force of the magnetic layer on the electromagnetic fluid, the magnetic particles are aggregated towards a region where the electric field exists or the electric field intensity is relatively high under the action of the electric field, so as to drive at least a portion of the electromagnetic fluid to move to the region where the electric field exists or the electric field intensity is relatively high. Along with the increase of the electric field intensity, the amount of the electromagnetic fluid aggregated in the electric filed is larger, that is, the amount of the electromagnetic fluid moving from the display region 101 to the non-display region 102 is larger.

Illustratively, in the non-display state, the display region is completely covered by the magnetic layer, that is, an orthographic projection of the display region on the first substrate coincides with an orthographic projection of the magnetic layer on the first substrate or falls within the orthographic projection of the magnetic layer on the first substrate. Thus, in the non-display state, the display region can be completely covered by the electromagnetic fluid of the electromagnetic fluid layer. For instance, the non-display region (or a portion of a chamber for accommodating the electromagnetic fluid, disposed in the non-display region) may be partially or completely covered by the electromagnetic fluid of the electromagnetic fluid layer.

Illustratively, in the non-display state, the thickness of the electromagnetic fluid layer may be designed to completely shield the light, so that the pixel unit will not have the problem of light leakage under dark state (for instance, the display grayscale is zero), and then the contrast of the display image can be improved. Along with the reduction of the thickness of the electromagnetic fluid layer in the display region, the light transmittance of the display region of the pixel unit will be gradually increased, so as to realize grayscale adjustment.

In at least one embodiment of the present disclosure, the pixel unit can have the function of adjusting the display grayscale, as long as the electric field generated by the control electrode is mainly distributed in the non-display region and the magnetic field is at least distributed in the display region. When the above conditions are satisfied, the arrangement modes of the control electrode and the magnetic layer may be adjusted according to specific demands. Description will be given below to several structures of the pixel unit according to several arrangement modes of the control electrode and the magnetic layer.

For instance, in the pixel unit provided by at least one embodiment of the present disclosure, in the non-display state, the electromagnetic fluid of the electromagnetic fluid layer is located in the display region; the magnetic layer is disposed in the display region; and the control electrode is disposed in the non-display region. Illustratively, as shown in FIGS. 1A and 1B, the magnetic layer 300 is disposed in the display region 101, and the control electrode 400 is disposed in the non-display region 102. Thus, as shown in FIG. 1A, in the non-display state, the electromagnetic fluid of the electromagnetic fluid layer 200 moves towards the magnetic layer 300 due to magnetic adsorption and is then aggregated in the display region 101. As shown in FIG. 1B, in the display state, the electric field generated by the control electrode 400 is distributed in the non-display region 102, so that at least a portion of the electromagnetic fluid in the display region 101 flows to the non-display region 102.

For instance, in the pixel unit provided by some embodiments of the present disclosure, the control electrode includes a first electrode disposed on the first substrate and a second electrode disposed on the second substrate, and orthographic projections of the first electrode and the second electrode on the first substrate are at least partially overlapped. Illustratively, as shown in FIGS. 1A and 1B, the control electrode includes a first electrode 410 and a second electrode 420; the first electrode 410 is disposed on the first substrate 110; and the second electrode 420 is disposed on the second substrate 120. Along a direction perpendicular to a plane where the first substrate 110 is located (along a direction of the z axis), the first electrode 410 and the second electrode 420 are overlapped to generate a vertical electric field in the case of being applied with voltage. Thus, the electric field intensity in the non-display region 102 is uniformly distributed, and in the z-axis direction, the electric field with uniformly distributed electric field intensity is distributed in a space between the first electrode 410 and the second electrode 420, so as to reduce the design area of the non-display region 102, increase the design area of the display region 101, and improve the aperture ratio of the pixel unit 100.

For instance, in some embodiments of the present disclosure, when the control electrode (the control electrode 400 as shown in FIGS. 1A and 1B) is provided to generate the vertical electric field, at least one electrode of the control electrode is spaced from the electromagnetic fluid layer, for instance, a first insulating layer is disposed between the first electrode and the electromagnetic fluid layer or between the second electrode and the electromagnetic fluid. Illustratively, as shown in FIGS. 1A and 1B, a first insulating layer 520 covering the first electrode 410 is disposed on the first substrate 110, and the first insulating layer 520 is disposed between the first electrode 410 and the electromagnetic fluid layer 200. Thus, in the case that the electromagnetic fluid (for instance, the magnetic particles therein) of the electromagnetic fluid layer is conductive, the first electrode 410, the electromagnetic fluid and the second electrode 420 will not form current, and then which ensures that an electric field is formed between the first electrode 410 and the second electrode 420.

For instance, in some other embodiments of the present disclosure, in the case that the electromagnetic fluid (for instance, the magnetic particles therein) is not conductive, the first electrode and the second electrode of the control electrode may be set to make contact with the electromagnetic fluid of the electromagnetic fluid layer, that is, the pixel unit may be not provided with the first insulating layer 520 as shown in FIGS. 1A and 1B.

Figure 2A:
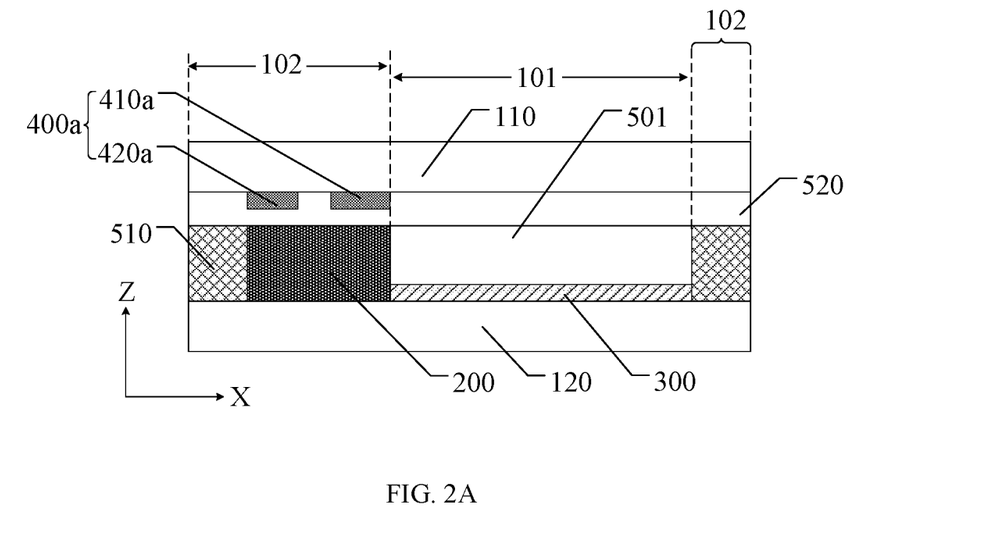
FIG. 2A is a cross-sectional view of another pixel unit provided by some embodiments of the present disclosure in a display state.

For instance, in the pixel unit provided by some other embodiments of the present disclosure, the control electrode may include a first electrode and a second electrode which are spaced away from each other, and the first electrode and the second electrode are arranged side by side on the first substrate or the second substrate, so as to generate a horizontal electric field when applied with voltage. Illustratively, as shown in FIG. 2A, a control electrode 400*a* includes a first electrode 410*a* and a second electrode 420*a* disposed on the first substrate 110; the first electrode 410*a* and the second electrode 420*a* are disposed in the non-display region 102; and orthographic projections of the first electrode 410*a* and the second electrode 420*a* on the first substrate 110 are spaced from each other. As shown in FIG. 2A, the pixel unit is in the display state, and after the first electrode 410*a* and the second electrode 420*a* are respectively applied with different voltages (or only one is applied with voltage), the first electrode 410*a* and the second electrode 420*a* can generate a horizontal electric field distributed in the non-display region 102. When the electric field intensity of the horizontal electric field is high enough, as shown in FIG. 2A, the electromagnetic fluid of the electromagnetic fluid layer 200 is aggregated in the horizontal electric field (the non-display region), and the pixel unit can realize the adjustment of the display grayscale by control of the electric field intensity. In addition, the second substrate 120 may be not required to be set to be an array substrate for controlling the electrode voltage of the control electrode 400*a*. For instance, the second substrate 120 may be set to be an opposed substrate (for instance, a CF substrate) which is cell-assembled with the array substrate.

For instance, in some embodiments of the present disclosure, in the case that the horizontal electric field can be generated when the control electrode is applied with voltage, the first electrode and the second electrode may be arranged in the same layer. Illustratively, as shown in FIG. 2A, the first electrode 410*a* and the second electrode 420*a* are arranged in the same layer. Thus, the first electrode 410*a* and the second electrode 420*a* may be made from the same conductive material film, so the manufacturing process of the pixel unit can be simplified and the cost can be reduced. For instance, a plurality of the first electrodes 410*a* and a plurality of the second electrodes 420*a* may be alternately arranged.

For instance, in at least one embodiment of the present disclosure, in the case that the horizontal electric field can be generated when the control electrode is applied with voltage and the first electrode and the second electrode are arranged in the same layer, the control electrode (the first electrode and the second electrode) and the magnetic layer may be disposed on different substrates as shown in FIG. 2A, or the control electrode and the magnetic layer may be disposed on the same substrate. For instance, in some embodiments, the first electrode, the second electrode and the magnetic layer are arranged in the same layer and are all made from the same conductive material film. Thus, the manufacturing process of the pixel unit can be simplified, and the cost can be reduced.

For instance, in the pixel unit provided by some other embodiments of the present disclosure, in the case that the control electrode is set to be able to generate the horizontal electric field when applied with voltage, the first electrode and the second electrode may be arranged in different layers. For instance, both the first electrode and the second electrode are disposed on the first substrate; the first electrode is disposed between the second electrode and the first substrate; the second electrode is provided to include a plurality of strip electrodes; the plurality of strip electrodes are spaced away from each other; and the first electrode is provided to be a plate electrode. Thus, after the first electrode and the second electrode are respectively applied with different voltages (or only one is applied with voltage), the first electrode and the second electrode can generate a horizontal electric field distributed in the non-display region, so as to control the electromagnetic fluid of the electromagnetic fluid layer, and then the pixel unit can realize the adjustment of the display grayscale.

For instance, in the pixel unit provided by at least one embodiment of the present disclosure, the control electrode may be provided to generate a vertical electric field and a horizontal electric field when applied with voltage, so as to control the electromagnetic fluid of the electromagnetic fluid layer. For instance, the control electrode may include a first electrode and a second electrode which are spaced away from each other; the first electrode and the second electrode are respectively disposed on the first substrate and the second substrate; at least one of the first electrode or the second electrode is set to include two sub-electrodes; and the two sub-electrodes may be applied with different voltages to generate the horizontal electric field. For instance, the first electrode is set to include at least one first sub-electrode and at least one second sub-electrode, and the second electrode is set to be a plate electrode. For instance, a plurality of the first sub-electrode and a plurality of the second sub-electrode may be arranged, and the plurality of the first sub-electrode and the plurality of the second sub-electrode are alternately arranged.

Figure 2B:
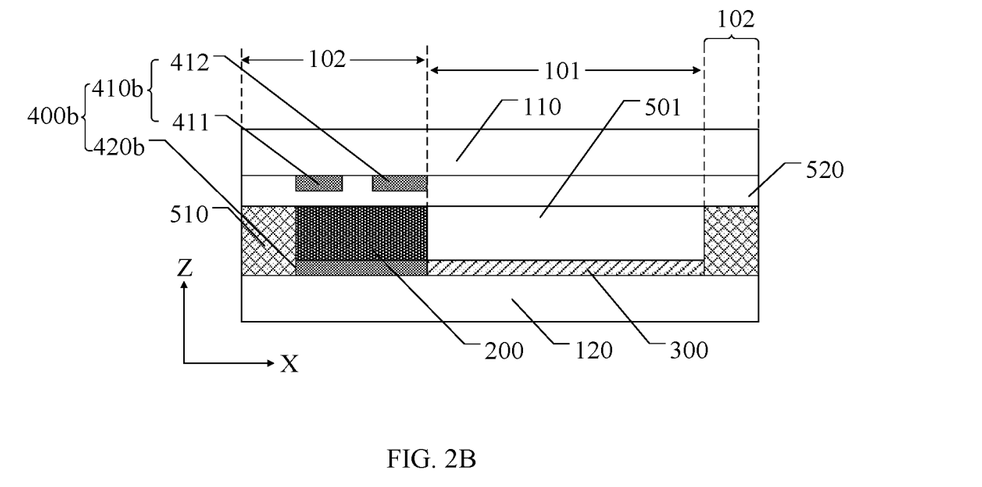
FIG. 2B is a cross-sectional view of another pixel unit provided by some embodiments of the present disclosure in a display state.

Illustratively, as shown in FIG. 2B, a control electrode 400*b* includes a first electrode 400*b* disposed on the first substrate 110 and a second electrode 420*b* disposed on the second substrate 120; the first electrode 400*b* and the second electrode 420*b* are disposed in the non-display region 102; and the first electrode 400*b* includes a first sub-electrode 411 and a second sub-electrode 412 which are spaced from each other. As shown in FIG. 2B, the pixel unit is in the display state; when the first electrode 400*b* and the second electrode 420*b* are respectively applied with different voltages (or only one is applied with voltage), the first electrode 400*b* and the second electrode 420*b* can generate a vertical electric field distributed in the non-display region 102; when the first sub-electrode 411 and the second sub-electrode 412 are respectively applied with voltage (or only one is applied with voltage), the first sub-electrode 411 and the second sub-electrode 412 can generate a horizontal electric field distributed in the non-display region 102. When the electric field intensity of the horizontal electric field and the vertical electric field generated by the control electrode 400*b* is high enough, as shown in FIG. 2B, the electromagnetic fluid of the electromagnetic fluid layer 200 are aggregated in the electric filed (the non-display region), so the pixel unit can realize the adjustment of the display grayscale by control of the electric field intensity.

In at least one embodiment of the present disclosure, shapes of the first electrode and the second electrode are not limited. For instance, shapes of the first electrode and the second electrode may be designed according to the distribution of the non-display region. For instance, shapes of the first electrode and the second electrode may include plate and ring, and may also be set to a shape including a plurality of electrode strips.

Figure 2C:
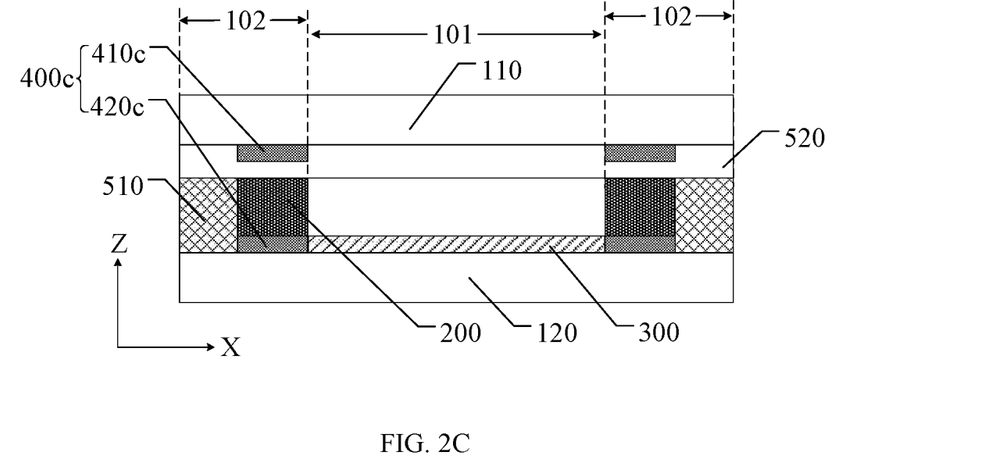
FIG. 2C is a cross-sectional view of another pixel unit provided by some embodiments of the present disclosure in a display state.
Figure 2D:
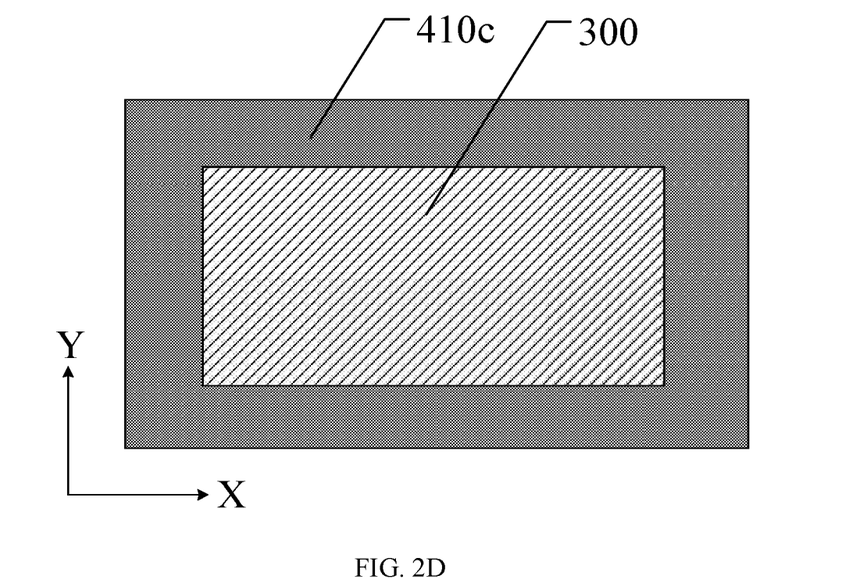
FIG. 2D is a top view of partial structure of the pixel unit as shown in FIG. 2C.

For instance, in at least one embodiment of the present disclosure, the non-display region is ring-shaped; the display region is disposed within the non-display region; and at least one of the first electrode or the second electrode of the control electrode is set to be a ring-shaped around the display region. Illustratively, as shown in FIGS. 2C and 2D, a control electrode 400c includes a first electrode 410c disposed on the first substrate 110 and a second electrode 420c disposed on the second substrate 120, and the first electrode 410c and the second electrode 420c are disposed in the non-display region 102. Orthographic projections of the first electrode 410c and the second electrode 420c on the first substrate 110 coincide with each other, and the first electrode 410c and the second electrode 420c can generate a vertical electric field when applied with voltage. For instance, when the pixel unit is switched from the non-display state to the display state, the electromagnetic fluid in the display region 101 can move towards the non-display region 102 at a periphery of the display region, so the electromagnetic fluid will not span over the entire display region 101 and arrive at the non-display region 102. Comparatively speaking, a movement distance of the electromagnetic fluid is small, namely the average movement distance of the electromagnetic fluid is reduced. Thus, the time required for switching between different display grayscales (the grayscale response time) of the pixel unit can be reduced, so the frame number and the fluency of the display image can be improved.

Description will be given below to the technical proposal in at least one embodiment of the present disclosure by taking the case that the control electrode (the control electrode 400 as shown in FIGS. 1A and 1B) is set to generate the vertical electric field as an example.

For instance, in the pixel unit provided by at least one embodiment of the present disclosure, the magnetic layer is disposed in the display region; the control electrode is disposed in the non-display region; in the non-display state, the electromagnetic fluid layer is located in the display region; and in this case, the magnetic layer may be arranged in the same layer with the second electrode. Illustratively, as shown in FIGS. 1A and 1B, the magnetic layer 300 and the second electrode 420 are arranged in the same layer. Thus, the design thickness of the pixel unit 100 can be reduced, thereby being favorable for the light and thin design of a product (for example, a display panel) comprising the pixel unit.

For instance, in the pixel unit provided by some embodiments of the present disclosure, when the magnetic layer and the second electrode are arranged in the same layer, the magnetic layer and the second electrode may be an integral structure. Illustratively, as shown in FIGS. 1A and 1B, the magnetic layer 300 and the second electrode 420 are an integral structure. For instance, after a conductive material film is deposited on the second substrate 120, the conductive material film is patterned (the patterning process may be not required if the second electrode and the magnetic layer form a common electrode), a portion of the conductive material film disposed in the non-display region 102 is formed as the second electrode 420, and a portion of the conductive material film disposed in the display region 101 is formed as the magnetic layer 300 after magnetization treatment. Thus, the manufacturing process of the pixel unit can be simplified, and the cost can be reduced. Moreover, the first electrode 410 is disposed in the non-display region 102. When the first electrode 410 and the second electrode 420 are applied with voltages, the electric field is mainly distributed in the non-display region 102, and the control electrode 400 can still control the distribution of the electromagnetic fluid in the display region 101 and the non-display region 102. In the embodiment of the present disclosure, "A and B are an integral structure" refers to that A and B are formed by the same film by the patterning process, arranged in the same layer, made from same material, and connected with each other.

For instance, in the pixel unit provided by some other embodiments of the present disclosure, when the magnetic layer and the second electrode are arranged in the same layer, the magnetic layer may be set to make contact with the second electrode and includes insulating materials. For instance, in the pixel unit provided by some other embodiments of the present disclosure, when the magnetic layer and the second electrode are arranged in the same layer, the magnetic layer may be set to be spaced from the second electrode, and may include insulating materials and may also include conductive materials. Thus, when the first electrode and the second electrode are applied with voltage, all the electric field is distributed in the non-display region, so as to avoid the generation of interference electric field between the first electrode and the magnetic layer, thereby improving the control precision of the control electrode on the electromagnetic fluid. For instance, when the electric field intensity is high enough, the electromagnetic fluid can entirely flow into the non-display region and will not remain in the display region.

For instance, in the pixel unit provided by at least one embodiment of the present disclosure, the magnetic layer includes a magnetic metallic element. For instance, the magnetic metallic element may include ferrum, cobalt, nickel, lanthanide elements, etc. For instance, the magnetic layer is an indium tin oxide (ITO) layer containing cobalt. For instance, after the magnetic ITO layer is formed on the second substrate 120, the magnetic metallic element cobalt is doped into the ITO layer or deposited on a surface of the ITO layer by utilization of the magnetron sputtering process, and the ITO layer with stable magnetism is formed by rapid annealing process. Due to the magnetic metallic element cobalt, the magnetic ITO layer has good permanent magnetism and can adsorb the electromagnetic fluid (the magnetic particles) which also has magnetism. For instance, the magnetron sputtering process may include physical vapor deposition (PVD). For instance, in the rapid annealing process, processing materials (for instance, the ITO layer containing cobalt) may be rapidly air-cooled to the room temperature after heated to a certain temperature (determined according to specific processing conditions), so as to reduce the internal stress and the structural defect of the formed film (for instance, the magnetic layer).

For instance, in the pixel unit provided by at least one embodiment of the present disclosure, in the non-display state, the electromagnetic fluid of the electromagnetic fluid layer is located in the display region and the non-display region; the magnetic layer is at least partially disposed in the display region; and the control electrode is disposed in the non-display region. Thus, the magnetic field is distributed in the display region and the non-display region, and the electric field is distributed in the non-display region. In the non-display state, the electromagnetic fluid of the electromagnetic fluid layer is aggregated in the display region and the non-display region, and in this case, the amount of the electromagnetic fluid in the non-display region is small, and the display region of the pixel unit has certain light transmittance. In the display state, the electric field generated by the control electrode is distributed in the non-display region, so that at least a portion of the electromagnetic fluid in the display region moves to the non-display region. In this process, the light transmittance of the display region of the pixel unit is increased. Thus, the light transmittance of the display region of the pixel unit can be adjusted, that is, the display grayscale of the pixel unit can be adjusted.

Figure 3A:
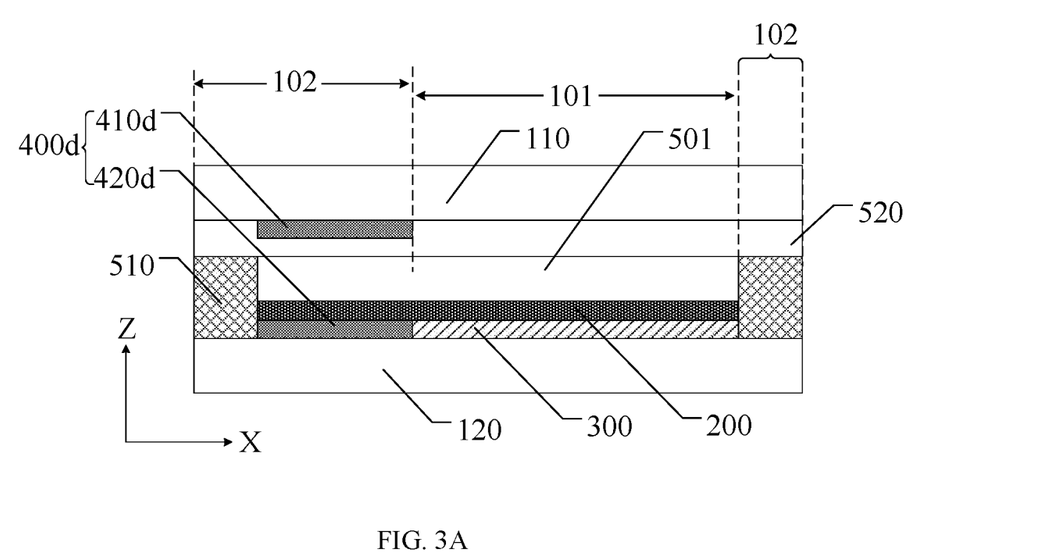
FIG. 3A is a cross-sectional view of another pixel unit provided by some embodiments of the present disclosure in a non-display state.
Figure 3B:
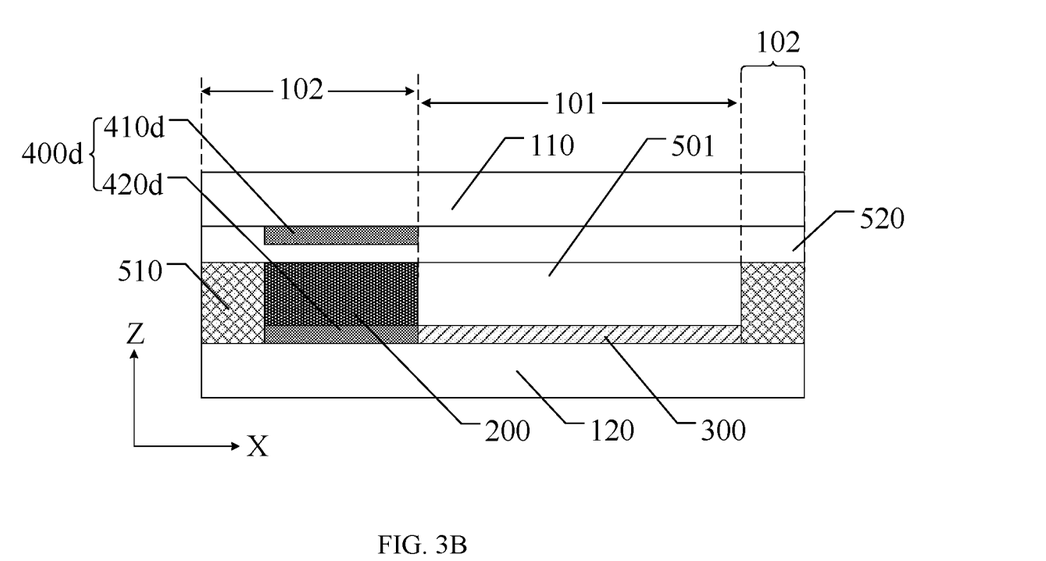
FIG. 3B is a cross-sectional view of the pixel unit as shown in FIG. 3A in a display state.

For instance, in the pixel unit provided by some embodiments of the present disclosure, the control electrode includes a first electrode disposed on the first substrate and a second electrode disposed on the second substrate; orthographic projections of the first electrode and the second electrode on the first substrate are at least partially overlapped; the magnetic layer is disposed in the display region and arranged in the same layer with the second electrode; and the magnetic layer and the second electrode include a magnetic metallic element. Illustratively, as shown in FIGS. 3A and 3B, the magnetic layer 300 is disposed in the display region 101; a control electrode 400d is disposed in the non-display region 102 and includes a first electrode 410d disposed on the first substrate 110 and a second electrode 420d disposed on the second substrate 120; orthographic projections of the first electrode 410d and the second electrode 420d on the first substrate 110 coincide with each other; and the magnetic layer 300 and the second electrode 420d include a magnetic metallic element. Thus, both the magnetic layer 300 and the second electrode 420d can generate a magnetic field, and the magnetic field is distributed in the display region 101 and the non-display region 102. As shown in FIG. 3A, in the non-display state, the electromagnetic fluid of the electromagnetic fluid layer 200 is distributed in the display region 101 and the non-display region 102. As shown in FIG. 3B, in the display state, the electric field generated by the control electrode 400 is distributed in the non-display region 102, so that the electromagnetic fluid in the display region 101 moves to the non-display region 102. The structure, the material, the position and the like of the magnetic layer 300 may refer to relevant description on the magnetic layer in the embodiment as shown in FIGS. 1A and 1B, and no further description will be given here.

Figure 4A:
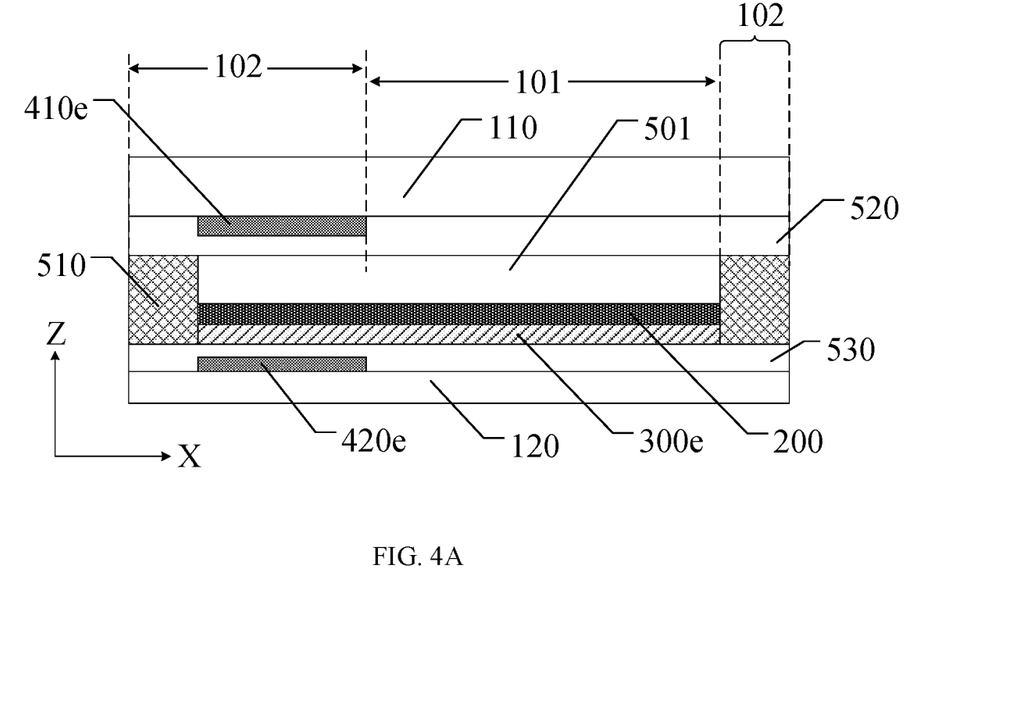
FIG. 4A is a cross-sectional view of another pixel unit provided by some embodiments of the present disclosure in a non-display state.
Figure 4B:
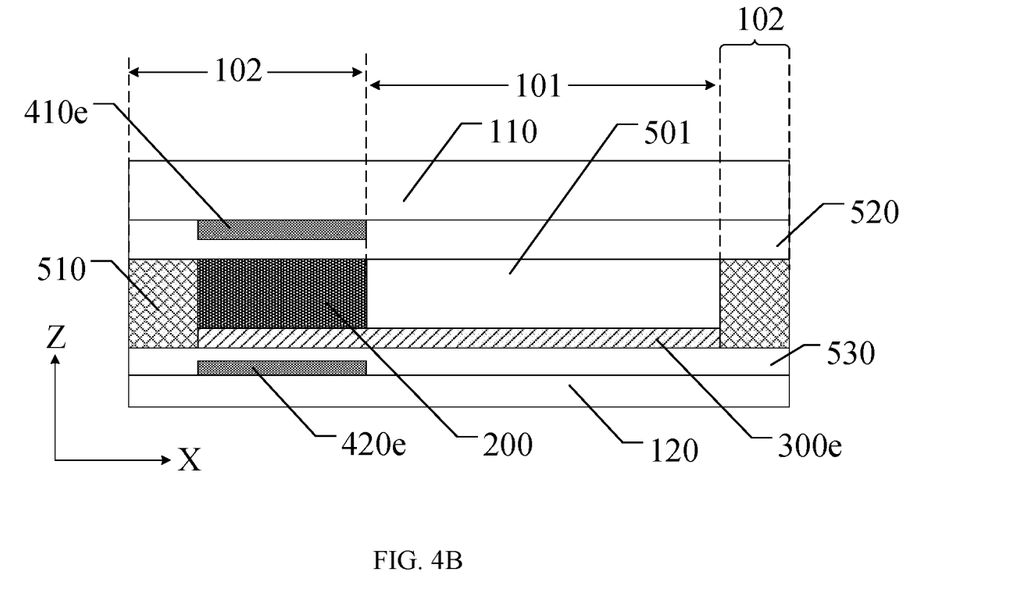
FIG. 4B is a cross-sectional view of the pixel unit as shown in FIG. 4A in a display state.

For instance, in the pixel unit provided by some embodiments of the present disclosure, the control electrode includes a first electrode disposed on the first substrate and a second electrode disposed on the second substrate; orthographic projections of the first electrode and the second electrode on the first substrate are at least partially overlapped; the magnetic layer is disposed in the display region and the non-display region and arranged in different layers with the second electrode; and the magnetic layer and the second electrode are overlapped in the non-display region. Illustratively, as shown in FIGS. 4A and 4B, a magnetic layer 300e is disposed in the display region 101; the control electrode is disposed in the non-display region 102 and includes a first electrode 410e disposed on the first substrate 110 and a second electrode 420e disposed on the second substrate 120; and orthographic projections of the first electrode 410e and the second electrode 420e on the first substrate 110 coincide with each other. Thus, the magnetic field generated by the magnetic layer 300e is distributed in the display region 101 and the non-display region 102. As shown in FIG. 4A, in the non-display state, the electromagnetic fluid of the electromagnetic fluid layer 200 is distributed in the display region 101 and the non-display region 102. As shown in FIG. 4B, in the display state, the electric field generated by the control electrode is distributed in the non-display region 102, so that the electromagnetic fluid in the display region 101 moves to the non-display region 102. For instance, the selection of the material of the magnetic layer 300e may refer to relevant description in the embodiment as shown in FIGS. 1A and 1B, and no further description will be given here.

For instance, in at least one embodiment of the present disclosure, when the magnetic layer and the second electrode of the control electrode are arranged in different layers, the magnetic layer may be disposed between the second electrode and the second substrate, or the second electrode is disposed between the magnetic layer and the second substrate (as shown in FIGS. 4A and 4B). For instance, when the material of the magnetic layer includes an insulating material, the magnetic layer and the second electrode may make contact with each other or an insulating layer may be disposed between the magnetic layer and the second electrode. For instance, when the material of the magnetic layer includes a conductive material, an insulating layer is disposed between the magnetic layer and the second electrode. Illustratively, as shown in FIGS. 4A and 4B, a second insulating layer 530 is disposed between the magnetic layer 300e and the second electrode 420e. For instance, the material of the second insulating layer 530 may include silicon oxide, silicon nitride, silicon oxynitride, etc.

For instance, in some embodiments of the present disclosure, a plurality of the pixel units are arranged; the plurality of pixel units share one chamber obtained by the cell-assembling of the first substrate and the second substrate; and the electromagnetic fluid of the electromagnetic fluid layer is distributed in the chamber. For instance, a sealant is disposed at a peripheral region of the first substrate and the second substrate. After the first substrate and the second substrate are cell-assembled, the sealant, the first substrate and the second substrate define one chamber, and the chamber corresponds to the plurality of pixel units.

Figure 5A:
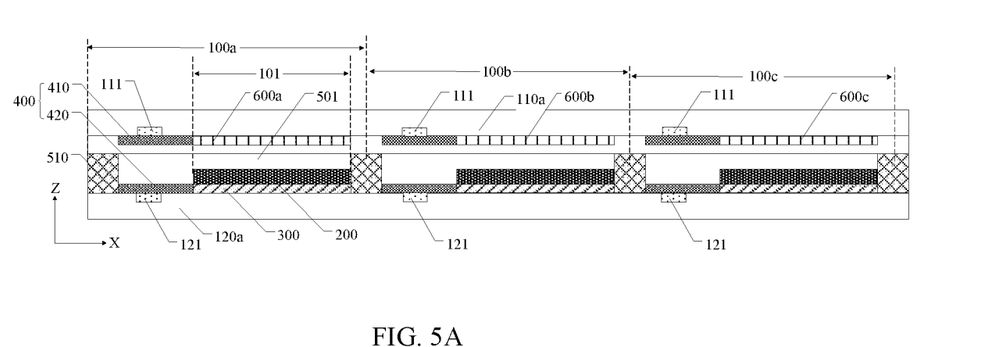
FIG. 5A is a cross-sectional view of a display panel provided by some embodiments of the present disclosure in a non-display state.

For instance, the pixel unit provided by some other embodiments of the present disclosure further comprises a pixel definition layer (PDL); the PDL, the first substrate and the second substrate define one chamber; and the chamber accommodates the electromagnetic fluid of the electromagnetic fluid layer. Illustratively, as shown in FIGS. 4A and 4B, a PDL 510 is disposed between the first substrate 110 and the second substrate 120; the PDL 510, the first substrate 110 and the second substrate 120 define an enclosed chamber 501 corresponding to each pixel unit; and the chambers 501 of adjacent pixel units are spaced from each other (for instance, referring to a display panel as shown in FIG. 5A). The chamber 501 is configured to accommodate the electromagnetic fluid of the electromagnetic fluid layer 200. In the process of controlling the display grayscale of each pixel unit, the distribution of the electromagnetic fluid in each pixel unit (for instance, the amount of the electromagnetic fluid in the display region) will not be interfered by the electric field and the electromagnetic fluid of adjacent pixel units, and then the precision and the sensitivity in control of the display grayscale of the pixel unit can be improved.

For instance, in at least one embodiment of the present disclosure, the material of the PDL has certain elasticity to support a gap of the first substrate and the second substrate, so as to maintain the cell thickness of the pixel unit. For instance, the material of the PDL may include a resin material such as polyimide (PI).

For instance, in some embodiments of the present disclosure, as shown in FIGS. 4A and 4B, when the pixel unit comprises a first insulating layer 520 and a PDL 510, the first insulating layer 520 and the PDL 510 may be an integral structure. For instance, in the manufacturing process of the pixel unit, after the first electrode 410e is formed on the first substrate, an insulating material film is deposited on the first electrode 410e and subjected to patterning process to form a groove in the insulating material film; a depth of the groove is less than the thickness of the insulating material film; and a remaining portion of the insulating material film after patterning is the first insulating layer 520 and the PDL 510. After the first substrate 110 and the second substrate 120 are cell-assembled, the groove in the insulating material film and the second substrate 120 form the chamber 501. It should be noted that the mode of forming the groove in the insulating material film is not limited to patterning, and the groove may be formed by other manner according to a process demand, for instance, the groove is formed in the insulating material film by an imprinting process.

For instance, in the pixel unit provided by at least one embodiment of the present disclosure, the electromagnetic fluid of the electromagnetic fluid layer is filled into a portion of the chamber. Illustratively, as shown in FIGS. 4A and 4B, the electromagnetic fluid of the electromagnetic fluid layer 200 is only filled into a portion of a space defined by the chamber 501. Thus, under the action of the electric field and the magnetic field, the electromagnetic fluid can move in the chamber.

For instance, in each pixel unit, a volume of the chamber located in the non-display region is not less than a volume of the electromagnetic fluid of the electromagnetic fluid layer. Thus, when the display grayscale of the pixel unit is maximum, all of the electromagnetic fluid can enter the non-display region and will not shield light in the display region, so the maximum brightness of the display image of the pixel unit can be improved.

For instance, in the pixel unit provided by at least one embodiment of the present disclosure, gas is filled into the chamber. The gas can maintain the air pressure in the chamber, so as to balance pressures between the inside and the outside of the substrate (the first substrate and the second substrate). For instance, the gas may be inert gas. Thus, the gas will not react with the electromagnetic fluid, the magnetic layer, the electrode and the like, and even the gas invades the inside of the substrate (for instance, elements such as thin-film transistors (TFTs) in the substrate), the gas will not damage the elements in the substrate, so the display function of the pixel unit will not be affected.

Figure 5B:
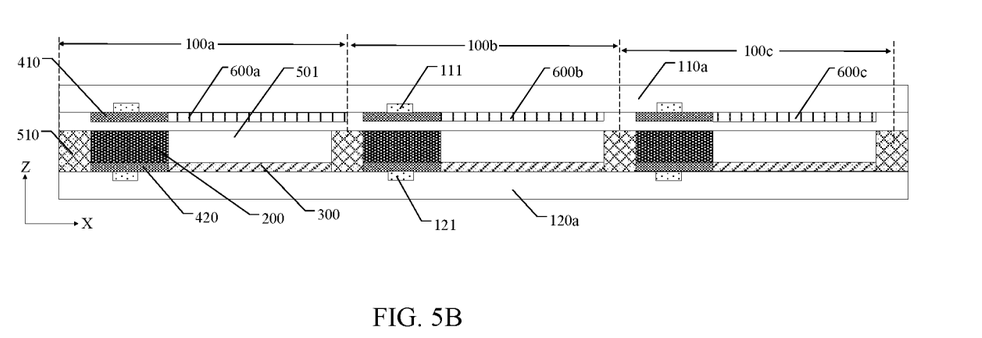
FIG. 5B is a cross-sectional view of the display panel as shown in FIG. 4A in a display state.

At least one embodiment of the present disclosure provides a display panel, which comprises a plurality of pixel units provided by any foregoing embodiment. For instance, the display panel comprises a plurality of pixel regions; each pixel region includes a plurality of subpixel regions; and each subpixel region is provided with one pixel unit. For instance, as shown in FIGS. 5A and 5B, one subpixel region of the display panel includes a first pixel unit 100a, a second pixel unit 100b and a third pixel unit 100c which are arranged side by side. The structures of the first pixel unit 100a, the second pixel unit 100b and the third pixel unit 100c may refer to relevant description of the pixel unit 100 in the above embodiment, and no further description will be given here.

For instance, in the display panel provided by at least one embodiment of the present disclosure, at least one of the first substrate or the second substrate is an array substrate. Illustratively, as shown in FIGS. 5A and 5B, a first substrate 110a is set to be an array substrate; in each pixel unit, a drive circuit 111 is disposed on the first substrate 110a and connected with the first electrode 410 of the control electrode 400; and the voltage on the first electrode 410 may be adjusted by utilization of the drive circuit 111. For instance, the second substrate 120a is set to be an array substrate; in each pixel unit, a drive circuit 121 is disposed on a second substrate 120a and connected with the second electrode 420 of the control electrode 400; and the voltage on the second electrode 420 may be adjusted by utilization of the drive circuit 121. For instance, the drive circuits 111 and 121 may include switching elements such as TFTs.

For instance, one of the first substrate and the second substrate is an array substrate, and the drive circuit for controlling the first electrode 410 and the second electrode 420 may be disposed on one of the first substrate and the second substrate, for example, disposed on one of the first substrate and the second substrate taken as the array substrate. No limitation will be given here in the embodiment of the present disclosure.

For instance, the display panel provided by at least one embodiment of the present disclosure further comprises a color filter. The color filter is at least partially disposed in the display region, and is disposed on the first substrate or the second substrate. Illustratively, as shown in FIGS. 5A and 5B, the first pixel unit 100a, the second pixel unit 100b and the third pixel unit 100c are respectively provided with a first color filter 600a, a second color filter 600b and a third color filter 600c. The first color filter 600a, the second color filter 600b and the third color filter 600c respectively transmit light of three colors, e.g., red light, green light and blue light. Thus, the first pixel unit 100a is a red subpixel R, the second pixel unit 100b is a green subpixel G, the third pixel unit 100c is a blue subpixel B. Therefore, the display panel can display a color image.

For instance, in at least one embodiment of the present disclosure, the color filter may be disposed on the second substrate, or the color filter may be disposed on the first substrate as shown in FIGS. 5A and 5B. For instance, in each pixel unit, the color filter may be disposed in both the display region and the non-display region, or the color filter may only be disposed in the display region. For instance, as shown in FIGS. 5A and 5B, when the color filter is disposed on the first substrate 110a, the color filter (for instance, the first color filter 600a) is disposed in the display region 101. For instance, the first color filter 600a and the first electrode 410 are arranged in the same layer. Thus, the design thickness of the display panel can be reduced, thereby being favorable for the light and thin design of the display panel. Moreover, the design area of the color filter can also be reduced; the usage amount of the material of the color filter can be reduced; and the production cost of the display panel can be reduced.

Figure 5C:
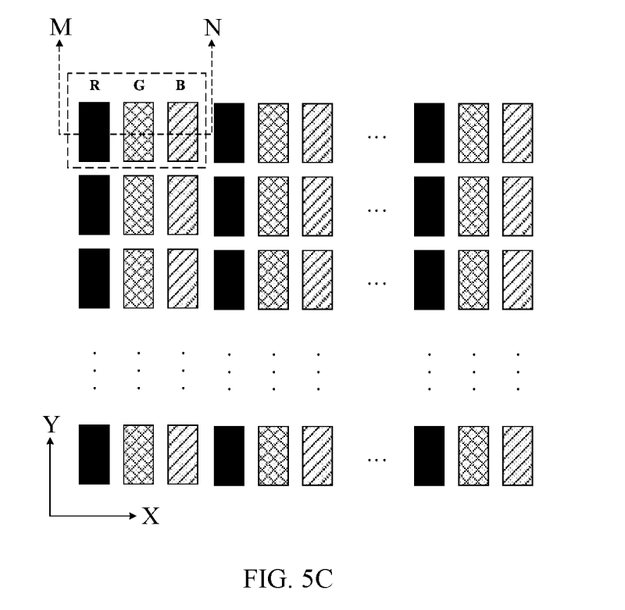
FIG. 5C is a plan view of the display panel as shown in FIGS. 5A and 5B.

In at least one embodiment of the present disclosure, the arrangement of the plurality of pixel units in the display panel is not limited. For instance, FIGS. 5A and 5B are cross-sectional views of the display panel as shown in FIG. 5C along M-N. As shown in FIG. 5C, the display panel comprises a plurality of rows and a plurality of columns of pixel regions (regions shown by dotted boxes); each pixel region includes pixel units of three colors (the first pixel unit (R), the second pixel unit (G) and the third pixel unit (B)); and the three subpixels are arranged in one row. The composition of each pixel region is not limited in the embodiment of the present disclosure. For instance, each pixel region may include a red subpixel R, a green subpixel G, a blue subpixel B and a white subpixel W. Moreover, for instance, each pixel region may include a red subpixel R, a green subpixel G, a blue subpixel B and a yellow subpixel Y.

For instance, in some embodiments of the present disclosure, the display panel may further comprise a black matrix (BM), and an orthographic projection of the BM on the first substrate falls within the non-display region. The BM can shield the non-display region of the display panel, so as to avoid the light leakage in the non-display region of the display panel, thereby improving the contrast of the display image.

For instance, when the BM is disposed in the display panel, in some embodiments of the present disclosure, the first electrode and the second electrode of the control electrode are transparent electrodes, and the orthographic projection of the BM on the first substrate coincides the non-display region.

For instance, when the BM is disposed in the display panel, in some other embodiments of the present disclosure, at least one of the first electrode or the second electrode of the control electrode is a non-transparent electrode; an orthographic projection of the BM on the first substrate is disposed outside an orthographic projection of the non-transparent electrode (the first electrode or the second electrode) on the first substrate; and the orthographic projections of the BM and the non-transparent electrode on the first substrate coincide the non-display region. A material of the BM (for instance, a black light shield material) is expensive. Thus, the BM only covers a portion of the non-display region of the display panel, so the amount of the material for forming the BM is reduced, and then the production cost of the display panel is reduced.

For instance, in some other embodiments of the present disclosure, in each pixel unit, at least one of the first electrode or the second electrode of the control electrode is set to be a non-transparent electrode, and an orthographic projection of the non-transparent electrode on the first substrate coincide the non-display region. Thus, the BM is not required to be disposed in the display panel, so the production cost of the display panel can be reduced.

For instance, in at least one embodiment of the present disclosure, when at least one of the first electrode or the second electrode of the control electrode is a non-transparent electrode, the non-transparent electrode may be a single-layer structure and may also be a multi-layer composite structure. For instance, the non-transparent electrode is a laminated layer comprising a plurality of conductive layers, e.g., a laminated layer of titanium-aluminum (or ITO)-titanium or molybdenum-aluminum (or ITO)-molybdenum. The multi-layer composite structure can reduce the reflection of the non-transparent electrode on light (for instance, ambient light), reduce the interference of the ambient light on the display image, and improve the contrast of the display image. For instance, when the non-transparent electrode is a composite structure of a plurality of film layers, in the manufacturing process of the non-transparent electrode, a laminated layer of a plurality of film layers may be deposited at a time, and then the laminated layer is subjected to patterning process (for instance, photolithography) to form the non-transparent electrode.

Figure 6:
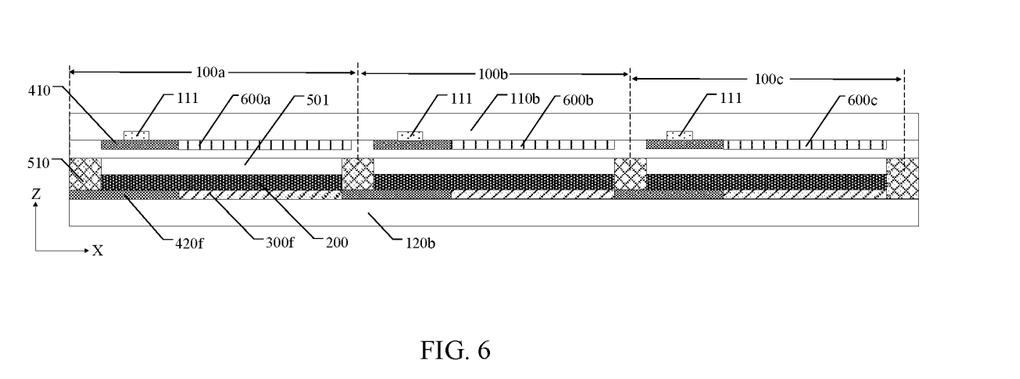
FIG. 6 is a cross-sectional view of another display panel provided by some embodiments of the present disclosure in a non-display state.

For instance, in some embodiments of the present disclosure, both the first substrate and the second substrate of the display panel are set to be an array substrate, and the structure of the display panel may refer to the embodiment as shown in FIGS. 5A and 5B. For instance, in some other embodiments of the present disclosure, one of the first substrate and the second substrate is set to be an array substrate. For instance, as shown in FIG. 6, a first substrate 110$b$ of the display panel is an array substrate, and a second substrate 120$b$ is an opposed substrate which is cell-assembled with the first substrate 110$b$. The structure of the first substrate 110$b$ may refer to the first substrate 110$a$ in the embodiment as shown in FIGS. 5A and 5B, and no further description will be given here. For instance, as shown in FIG. 6, a second electrode 420$f$ and a magnetic layer 300$f$ of the plurality of pixel units are an integral structure to form a common electrode together. Thus, the second substrate 120$b$ is not required to be provided with a complex drive circuit and is only required to be provided with a signal line connected with the common electrode. The signal line may be disposed at a peripheral region of the second substrate 120$b$, so the structure of the second substrate 120$b$ is simplified, and then the design thickness and cost of the display panel are reduced.

For instance, at least one embodiment of the present disclosure provides a display device, which comprises a light source module and the display panel provided by any foregoing embodiment. For instance, the light source module is a backlight module. For instance, the backlight module may be disposed on a side of the first substrate opposite to the second substrate, and a side of the second substrate opposite to the first substrate is a display side of the display panel; or the backlight module may be disposed on a side of the second substrate opposite to the first substrate, and a side of the first substrate opposite to the second substrate is a display side of the display panel.

At least one embodiment of the present disclosure provides a display method of a pixel unit, wherein the pixel unit includes a display region and a non-display region and further includes a first substrate, a second substrate, a fluid layer and a control structure, the fluid layer is disposed between the first substrate and the second substrate and a fluid is disposed on the fluid layer and the fluid is controllable fluid; the control structure is disposed between the first substrate and the second substrate and is configured to control the flow of the fluid. The method comprises: controlling the fluid to adjust the grayscale of the pixel unit; and allowing the amount of the fluid in the display region when the pixel unit is in the non-display state to be greater than the amount of the fluid in the display region when the pixel unit is in the display state. In the non-display state, the fluid is controlled to be at least partially located in the display region; and in the display state, at least a portion of the fluid in the display region is controlled to move to the non-display region. In the pixel unit, the amount of the fluid in the display region is controlled by utilization of the movement of the fluid between the display region and the non-display region. Thus, the light transmittance of the display region of the pixel unit can be adjusted, and then the display grayscale of the pixel unit can be adjusted. In addition, in the pixel unit, no polarizer is required in the aspect of adjusting the light transmittance of the display region, so the utilization of light (for instance, backlight) is high, and then the contrast of the display image can be improved.

For instance, in the display method provided by at least one embodiment of the present disclosure, the pixel unit further includes a control structure which is disposed between the first substrate and the second substrate and is configured to control the flow of the fluid; the control structure includes a magnetic layer at least partially disposed in the display region and a control electrode disposed in the non-display region; the fluid is electromagnetic fluid; and the fluid layer is an electromagnetic fluid layer. The method further comprises: allowing the electromagnetic fluid of the electromagnetic fluid layer to be located on the magnetic layer in the non-display state; and controlling the control electrode to generate an electric field in the display state, so that the electromagnetic fluid of the electromagnetic fluid layer flows from the display region to the non-display region. The magnetic layer can generate a magnetic field in the display region, and the control electrode can generate an electric field in the non-display region in the case of being applied with voltage. In the non-display state, the control electrode does not generate the electric field (for instance, not applied with voltage), and magnetic particles of the electromagnetic fluid are aggregated towards the magnetic layer under the action of magnetic field, so that the electromagnetic fluid covers the magnetic layer. In the display state, the control electrode generates the electric field, and the magnetic particles are aggregated towards a region where the electric field exists or where the electric filed intensity is relatively high under the action of the electric field, so that at least a portion of the electromagnetic fluid moves towards the region where the electric field exists or where the electric filed intensity is relatively high. Along with the enhancement of the electric field, the amount of the electromagnetic fluid aggregated in the electric field is larger. Thus, the light transmittance of the display region of the pixel unit can be adjusted.

In the pixel unit, the display method thereof and the display panel provided by at least one embodiment of the present disclosure, the light transmittance of the display region of the pixel unit can be adjusted by utilization of the movement of the fluid between the display region and the non-display region, and then the display grayscale of the pixel unit can be adjusted. In addition, no polarizer is required in the aspect of adjusting the light transmittance of the display region of the pixel unit, so the light utilization is high.

In the display method of the pixel unit provided by at least one embodiment of the present disclosure, the structure of the pixel unit may refer to relevant description in the above embodiments (the embodiments as shown in FIGS. 1A and 1B, FIGS. 3A and 3B, and FIGS. 4A and 4B), and no further description will be given here.

The following statements should be noted:

(1) The accompanying drawings involve only the structure(s) in connection with the embodiment(s) of the present disclosure, and other structure(s) may be referred to common design(s).

(2) In case of no conflict, features in one embodiment or in different embodiments can be combined to obtain a new embodiment.

What are described above is related to the specific embodiments of the disclosure only and not limitative to the scope of the disclosure. The protection scope of the disclosure shall be based on the protection scope of the claims.

The application claims priority to the Chinese patent application No. 201910099898.5, filed Jan. 31, 2019, the disclosure of which is incorporated herein by reference as part of the application.

The invention claimed is:

1. A pixel unit, comprising a display region and a non-display region, further comprising:
a first substrate and a second substrate;
a fluid layer, disposed between the first substrate and the second substrate, wherein a fluid is disposed in the fluid layer, and a flow of the fluid is controllable; and
a control structure, disposed between the first substrate and the second substrate and configured to control the flow of the fluid,
wherein the fluid is an electromagnetic fluid, the fluid layer is an electromagnetic fluid layer, and the fluid is a non-transparent magnetic liquid and includes a magnetic particle, a base fluid and an active, agent.

2. The pixel unit according to claim 1, wherein
a grayscale of the pixel unit is increased with a reduction of an amount of the fluid in the display region.

3. The pixel unit according to claim 2, wherein
the grayscale of the pixel unit is increased with a reduction of a thickness of the fluid in the display region.

4. The pixel unit according to claim 1, wherein
in a non-display state, at least a portion of the electromagnetic fluid of the electromagnetic fluid layer is located in the display region.

5. The pixel unit, comprising a display region and a non-display region, further comprising:
a first substrate and a second substrate;
a fluid layer, disposed between the first substrate and the second substrate, wherein a fluid is disposed in the fluid layer, and a flow of the fluid is controllable; and
a control structure, disposed between the first substrate and the second substrate and configured to control the flow of the fluid,
wherein the fluid is an electromagnetic fluid, the fluid layer is an electromagnetic fluid layer, and the fluid is a non-transparent magnetic liquid and includes a magnetic particle, a base fluid and an active agent, wherein the control structure includes:
a magnetic layer, disposed on the second substrate and at least partially disposed in the display region; and
a control electrode, disposed between the first substrate and the second substrate,
wherein the magnetic layer is configured to be a transparent film layer, and
the control electrode is configured to generate an electric field when the pixel unit is in a display state, so that the electromagnetic fluid of the electromagnetic fluid layer flows from the display region to the non-display region.

6. The pixel unit according to claim 5, wherein in a non-display state, the electromagnetic fluid of the electromagnetic fluid layer is located in the display region,
the magnetic layer is disposed in the display region, and the control electrode is disposed in the non-display region.

7. The pixel unit according to claim 5, wherein
the control electrode includes a first electrode disposed on the first substrate and a second substrate disposed on the second substrate, and
orthographic projections of the first electrode and the second electrode on the first substrate are at least partially overlapped.

8. The pixel unit according to claim 7, wherein
the magnetic layer and the second electrode are arranged in an identical layer.

9. The pixel unit according to claim 8, wherein
the magnetic layer and the second electrode are an integral structure.

10. The pixel unit according to claim 5, wherein
the magnetic layer includes a magnetic metallic element.

11. The pixel unit according to claim 5, wherein in a non-display state, the electromagnetic fluid of the electromagnetic fluid layer is located in the display region and the non-display region, and the control electrode is disposed in the non-display region.

12. The pixel unit according to claim 11, wherein the control electrode includes a first electrode disposed on the first substrate and a second electrode disposed on the second substrate, orthographic projections of the first electrode and the second electrode on the first substrate are at least partially overlapped, and the magnetic layer is disposed in the display region and arranged in an identical layer with the second electrode, and the magnetic layer and the second electrode include a magnetic metallic element; or the magnetic layer is disposed in the display region and the non-display region and arranged in different layers with the second electrode, and the magnetic layer and the second electrode are overlapped in the non-display region.

13. The pixel unit according to claim 1, further comprising:

a pixel define layer, defining a chamber with the first substrate and the second substrate, wherein the chamber accommodates the fluid layer, and the fluid of the fluid layer is filled into a portion of the chamber.

14. The pixel unit according to claim 13, wherein a volume of the chamber in the non-display region is greater than or equal to a volume of the fluid, and gas is filled into the chamber.

15. The pixel unit according to claim 1, wherein the control electrode includes a first electrode and a second electrode disposed on one of the first substrate and the second substrate, and the first electrode and the second electrode are arranged in an identical layer and are spaced from each other.

16. A display panel, comprising the pixel unit according to claim 1.

17. The display panel according to claim 16, further comprising:

a color filter, at least partially disposed in the display region, wherein the color filter is disposed on the first substrate or disposed on the second substrate, and at least one of the first substrate or the second substrate is an array substrate.

18. A display method of a pixel unit, wherein the pixel unit includes a display region and a non-display region and further includes a first substrate, a second substrate and a fluid layer which is disposed between the first substrate and the second substrate, a fluid is disposed in the fluid layer and a flow of the fluid is controllable, the pixel unit further includes a control structure disposed between the first substrate and the second substrate, the control structure is configured to control the flow of, the fluid, the fluid is an electromagnetic fluid, the fluid layer is an electromagnetic fluid layer, and the fluid is a non-transparent magnetic liquid and includes a magnetic particle, a base fluid and an active agent, and the method comprises:

controlling the flow of the fluid to adjust a grayscale of the pixel unit; and allowing an amount of the fluid in the display region when the pixel unit is in a non-display state to be greater than an amount of the fluid in the display region when the pixel unit is in a display state.

19. The display method according to claim 18, wherein the control structure includes a magnetic layer which is at least partially disposed in the display region and a control electrode which is disposed in the non-display region, and the method further comprises:

allowing the electromagnetic fluid to be located on the magnetic layer in the non-display state; and controlling the control electrode to generate an electric field in the display state, so that the electromagnetic fluid flows from the display region to the non-display region.

* * * * *